United States Patent [19]
Eilam et al.

[11] Patent Number: 4,833,446
[45] Date of Patent: May 23, 1989

[54] KEYBOARD APPARATUS AND METHOD

[75] Inventors: Zohar Eilam, Ramat Aviv; Zeev Bar Itzchak, Haifa, both of Israel

[73] Assignee: Ergoplic Ltd., Kiron, Israel

[21] Appl. No.: 14,173

[22] Filed: Feb. 12, 1987

Related U.S. Application Data

[63] Continuation of Ser. No. 462,077, Jan. 28, 1983, Continuation-in-part of Ser. No. 208,813, Nov. 20, 1980, abandoned.

[30] Foreign Application Priority Data

| Nov. 21, 1979 | [IL] | Israel | 58767 |
| Feb. 2, 1982 | [IL] | Israel | 64914 |
| Aug. 22, 1982 | [IL] | Israel | 66603 |

[51] Int. Cl.$^4$ ............................................. H01H 3/04
[52] U.S. Cl. ..................................... 341/22; 400/482; 400/489
[58] Field of Search ................... 340/365 R, 365 S, 6; 400/482, 488, 489

[56] References Cited

U.S. PATENT DOCUMENTS

| 1,143,160 | 6/1915 | Anderson | 400/482 |
| 3,022,878 | 2/1962 | Seibel | 340/365 R |
| 3,480,744 | 11/1969 | Yamada | . |
| 3,761,918 | 9/1973 | Hatano | 340/365 E |
| 3,767,022 | 10/1973 | Olson | . |
| 3,805,939 | 4/1974 | Ross | . |
| 3,945,482 | 3/1976 | Einbinder | 400/489 |
| 4,042,777 | 8/1977 | Bequaert | 340/365 R |
| 4,081,068 | 3/1978 | Zapp | 400/489 |
| 4,244,659 | 1/1981 | Malt | . |
| 4,263,582 | 4/1981 | Dumbovic | 340/365 S |

FOREIGN PATENT DOCUMENTS

| 557974 | 9/1932 | Fed. Rep. of Germany . |
| 2502461 | 7/1975 | Fed. Rep. of Germany . |
| 2613906 | 10/1977 | Fed. Rep. of Germany . |
| 2827966 | 1/1980 | Fed. Rep. of Germany . |
| 568954 | 4/1924 | France . |
| 2101635 | 3/1972 | France . |
| 0013221 | 1/1979 | Japan . |
| 0087225 | 7/1980 | Japan . |
| 1496522 | 12/1977 | United Kingdom . |
| 2015220 | 9/1979 | United Kingdom . |

OTHER PUBLICATIONS

"The Chord Keyboard", *Computer*, Rochester, Dec. 1978, pp. 57-63, IEEE.
"Cryptanalysis", *Dover Publications*, Gaines, N.Y. 1956.
"Human Engineering Guide to Equipment Design", Van Cott, American Institute of Research, 1972.
*Technical Paper 249*, Sidorsky, U.S. Army, 1974.
"A Typewriter in Your Pocket" *Computer Weekly*, May 1978.
IBM Technical Disclosure Bulletin, vol. 22, No. 12, May 1980, pp. 5504-5505, NY US, E. C. Bequaert "Typamatic Feature for Chord Keyboard".
Machine Design, vol. 28, No. 19, Sep. 20, 1956, p. 98, Clevlenad, US, "Constant Force Action".

*Primary Examiner*—John W. Caldwell, Sr.
*Assistant Examiner*—Tyrone Queen
*Attorney, Agent, or Firm*—Cushman, Darby & Cushman

[57] ABSTRACT

A chordic keyboard including chordic data entry locations corresponding to the five fingers of the human hand and correlation apparatus for correlating a set of chordic data entry location engagement combinations to a set of letters in accordance with a code which is characterized in that available data entry location engagement combinations are arranged in a plurality of groups, the engagement combinations in each group having a predetermined relationship among their fingering patterns, each group being matched with letters forming a recognizable combination of letters, whereby the fingering patterns are readily memorizable.

22 Claims, 10 Drawing Sheets

```
              (1 2 3 4 5)
           N        5
    30 →   O      4
           T    3
           E  2
          L 1 2
    32 → A   2 3
          S     3 4
          H       4 5

R 1   3
    34 → I 1     4
         D 1       5

C 1 2 3
    36 → U   2 3 4
         P     3 4 5

K 1 2 3 4
    38 → G   2 3 4 5
         B 1 2 3 4 5

40 → V   2     5
         Y   2   4

42 → W 1 2   4
         X 1 2     5

F 1   3 4 5
    44 → M 1   3 4
         Q 1     4 5

46 → J 1 2   4 5
         Z   2   4 5
```

✻ 1 = thumb;   5 = small finger

FIG. 10

| I | II | III | IV |   |   |   |   | V |
|---|----|----|---|---|---|---|---|---|
|   |    |    | 1 | 2 | 3 | 4 | 5 |   |
| 1 | I  | A  | N |   | X |   |   | V |
| 2 | Z  | B  | O |   | X |   |   | O |
| 3 | B  | C  | T |   |   | X |   | T |
| 4 | H  | D  | E |   |   | X |   | H |
| 5 | S  | E  | L |   |   |   | X | F |
| 6 | G  | F  | A | X | X |   |   | V |
| 7 | J  | G  | S |   | X | X |   | X |
| 8 | E  | H  | H |   |   | X | X | S |
| 9 | Q  | J  | R |   |   | X | X | E |
| 0 | O  | K  | I | X | X | X |   | N |
|   |    |    |   |   | X | X | X | Z |

FIG. 11

| I | II |
|---|----|
| , | C  |
| . | P  |
| [ | B  |
| . |    |
| : |    |

FIG. 12

KEYBOARD APPARATUS AND METHOD

REFERENCE TO RELATED APPLICATION

This is a continuation of application Ser. No. 462,072, filed Jan. 28, 1983, which was abandoned upon the filing hereof and which was a continuation-in-part of Ser. No. 208,813 filed Nov. 20, 1980, now abandoned.

FIELD OF THE INVENTION

The present invention relates to keyboards generally and more particularly to chordic keyboards and to techniques which greatly increase the efficiency of learning operation of such keyboards and to codes useful therein.

BACKGROUND OF THE INVENTION

Conventional keyboards, having a multiplicity of keys, usually more than fifty in total, are universally used for typing and data entry. These keyboards have a number of significant disadvantages including a long time required for learning their operation, a requirement for continuous practice to maintain proficiency and large size, weight and bulk. Touch typing is required in order to reach speeds of above 150 characters per minute.

The revolutionary development of computer technology has greatly broadened the application of data processing and has brought data input terminals into environments, such as the home and executive offices where they were not previously known. This broadening has made the data input terminals accessible to persons who have neither the time nor the inclination to undergo extended training in the use thereof. In order not to limit tha applicability of data processing to persons who are specially and extensively trained in the use of data input terminals and to extend the availability of data input terminals to environments which greatly limit the permissible size of such terminals, it is necessary to provide data input terminals which can be operated efficiently by persons having a minimum of training and who use the terminals only intermittently. The data input terminals must be sufficiently small to be placed unobtrusively on an executive desktop.

Applicants have identified eight characteristics which are desirable in a keyboard in order for it to meet the requirements of a broad, untrained user population. They are small size and weight, portability, short time required for operator training, convenience of operation, limited operator effort and concentration requirements; short required retaining time after an interruption in use, speed of data entry, and low cost.

Chordic keyboards have been developed in an attempt to fulfill the above criteria. For the purposes of the present specification and claims, a chordic keyboard is defined as a keyboard wherein a plurality of data entry locations must be engaged to produce a single letter or other symbol. Chordic keyboards thus defined may be distinguished from conventional keyboards in which each key defines one or more letters or symbols as well from keyboards in which engagement of a plurality of data entry locations defines a word.

Various types of chordic keyboards are known and are described in the literature. Examples of such keyboards are described in the following publications:

1. N. Rochester, F. Bequaert and E. M. Sharp, "The Chord Keyboard" COMPUTER, December 1978, pp. 57-63;

2. R. C. Sidorsky, "Alpha Dot, A New Approach to Direct Computer Entry of Battlefield Data" Technical Report 249, U.S. Army Research Institute for the Behavioural and Social Sciences, 1974;

3. U.K. Patent Specifications No. 1,496,522 and 1,500,674;

4. U.K. Patent Application No. 2,015,220

The above-described keyboards, while all offering certain advantages in terms of convenience of use do not display any particular advantage in terms of learning time, retraining time or speed of data entry. The chordic keyboards described hereinabove are all characterized in having a relatively large code set which must be learned by the user and mastered in order to provide high speed data entry.

To the best of applicants' knowledge, none of the above-described keyboards has met with commercial success for the following reasons: (1) The large code set makes learning difficult and time consuming and retraining time significant, (2) The code set which associates the letters and symbols with key combinations is not selected for motoric ease, particularly in transitions between letters often occuring together; (3) Symbols and numbers have their own codes which must be learned in addition to the letter codes; (4) Even where a mnemonic link is provided between functions and alphabet letters, the key location combinations are different, even though the finger combinations remain the same; (5) The total number of symbols and control instructions is severely limited particularly in the embodiment disclosed in the aforesaid British Patent Specifications.

Research by the applicants has indicated the importance of key functioning to the overall motoric efficiency of a chordic keyboard. The present invention is directed to keyboard key structures in a chordic keyboard which greatly enhance the operational efficiency thereof.

Generally speaking it is known to use mnemonic devices for teaching code operations. Such mnemonic devices, for example as described in U.K. Patent Specification No. 8,036,839 employ a geometrical association concept in which the shape of a letter or other symbol to be coded has a certain geometrical resemblence to the configuration of engagement locations required to encode or define such a letter or symbol.

None of the prior art literature, including patent literature, on chordic keyboards teaches the use of a group approach to chordic keyboard code teaching.

SUMMARY OF THE INVENTION

The present invention seeks to provide a chordic keyboard having significantly enhanced motoric efficiency as compared with chordic keyboards of the prior art.

There is thus provided in accordance with an embodiment of the present invention a chordic keyboard comprising a plurality of data entry locations, first correlation apparatus for correlating a set of data entry location engagement arrangements to a first set of symbols in accordance with a first code and second correlation apparatus including function entry means for correlating a second set symbols to the set of data entry location engagement arrangements in accordance with a second code.

In accordance with a preferred embodiment of the invention, the first code is designed for motoric efficiency and the second code employs mnemonic devices.

The term "data entry location engagement arrangement" refers to a particular spatial relationship between a particular combination of data entry locations and thus refers to a relative relationship between locations and not necessarily to a particular set of locations. Therefore a single data entry location engagement arrangement may refer to one or more groups of keys, provided that the spatial relationship between the keys remains identical.

Further in accordance with an embodiment of the invention there is provided a chordic keyboard comprising a plurality of data entry locations and correlation means for correlating a set of combinations of data entry location engagement arrangements to a set of symbols in accordance with a code, the code being characterized by motoric efficiency. The code may thus provide relatively easy motoric transitions between data entry location engagement arrangements corresponding to letters which occur adjacent each other with relatively high frequency. Alternatively or additionally data entry location engagement arrangements employing different fingers are matched to symbols occuring adjacent each other with relatively high frequency.

There is also provided in accordance with a preferred embodiment of the invention a chordic keyboard including a plurality of keys, each key having a predetermined travel path and an entry location disposed at a predetermined location along the predetermined travel path, the plurality of keys arranged for engagement by respective first, second and third fingers, the first, second and third keys having differences between themselves in one or more of their predetermined travel paths, entry locations and force requirements.

Additionally in accordance with an embodiment of the present invention there is provided a chordic keyboard including a plurality of keys, each key having a predetermined travel path of length in the range of 3-9 mm.

Further in accordance with an embodiment of the invention, there is provided a chordic keyboard including a plurality of keys, the keys having a linear force/displacement characteristic over their travel paths.

Still further in accordance with an embodiment of the present invention, the entry location of each key is located at a position between one third and one half of the distance from the at rest position of the key to its fully depressed position.

Additionally in accordance with an embodiment of the present invention, there is provided a chordic keyboard including a plurality of keys, each key having a predetermined travel path which is arranged along a travel axis, the travel axes of various keys being non-parallel.

Further in accordance with an embodiment of the present invention, the travel axes of the various keys are arranged to be parallel to the axes of force exertion of human fingers arranged to engage the respective keys.

Additionally in accordance with an embodiment of the present invention there is proveded apparatus for providing a repeat key output when a key is depressed for a time beyond 200-600 msec.

The present invention also relates to a method for high speed teaching of chordic keyboard code operation. In accordance with an embodiment of the present invention the method comprises the steps of:

selecting a plurality of chordic keyboard engagement location arrangements having a predetermined visually sensible geometric relationship therebetween;

assigning to each of the plurality of location engagement arrangements a symbol corresponding thereto; and presenting the plurality of location engagement arrangements together with a word defined by the plurality of symbols corresponding thereto for memorization by an operator during training.

Further in accordance with an embodiment of the invention each of the plurality of location engagement arrangements and corresponding words defines a group which is remembered by interassociation therebetween. A plurality of such groups containing therewithin all of the symbols sought to be taught are defined and taught to the operator during training.

Additionally in accordance with an embodiment of the invention there is provided a high speed teachable code for use with chordic keyboards and comprising:

a first plurality of groups of associated symbols and location engagement arrangements, each group comprising:

a second plurality of location engagement arrangements having a visually sensible geometrical relationship therebetween, each of the location engagement arrangements having associated therewith a symbol, the symbols of each group being combinable in a readily memorizable word.

In accordance with a preferred embodiment of the invention the symbols comprise letters.

BRIEF DESCRIPTION OF THE DRAWINGS

The present invention will be more fully understood and appreciated from the following detailed description taken in conjunction with the drawings in which:

FIG. 10 is an illustration of a plurality of groups of location engagement arrangements and corresponding symbols according to a preferred embodiment of the invention;

FIG. 11 is an illustration of a plurality of alternative number coding conventions;

FIG. 12 is a partial illustration of a plurality of symbol coding conventions;

DETAILED DESCRIPTION OF THE INVENTION

Extensive research carried out by applicants has lead to an appreciation of the importance of correct key operation characteristics in chordic keyboard performance. A brief description of the results of this research will be presented hereinbelow in order to enable a complete understanding of the present invention in its context.

It is well known in the design of push buttons and switches that some type of feedback must be provided to an operator to indicate to him that he has completed an operation and thus to enable him to proceed to a subsequent operation. Such feedback may take a number of forms, including, for example, auditory feedback, such as beeps emitted by calculators upon actuation of a number key; visual feedback, such as the light illuminated on a push button in an elevator upon actuation thereof; tactile feedback, such as the sensed contact between an operators fingers and a key employed in non-moving switch contacts in calculators and elevators etc.; and kinesthetic feedback, such as the sensed motion of a key on a typewriter.

It has been found that visual and auditory feedback is not normally sufficient for keyboard operation since it is not sufficiently time definitive and thus requires too much time between subsequent operations. The general wisdom regarding feedback to push button operation is summarized by C. R. Clare in Electronic Design News, Apr. 20, 1976 at page 99 as follows: "The natural or expected consequences of a push is a tactile response. Sudden well-defined changes in pressure, accompanied by an audible signal that is related to the pressure change, are the most acceptable responses."

Figure 1:
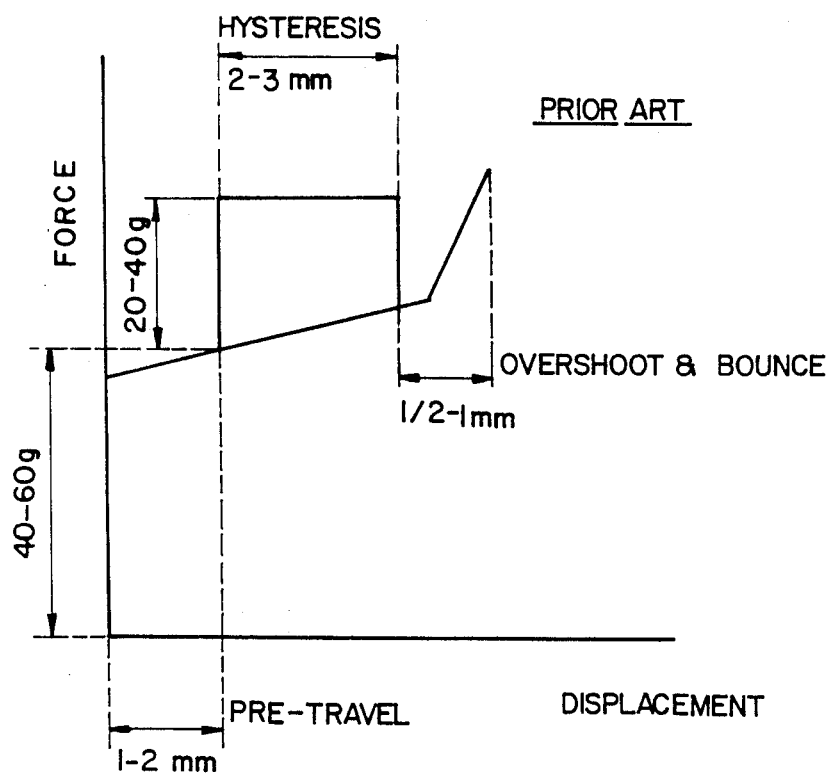
FIG. 1 is a diagrammatic illustration of the operation of a prior art key employed in a prior art keyboard.

Reference is made to FIG. 1 which illustrates characteristics of a conventional prior art key such as that used in a manual or electric typewriter. The diagram of FIG. 1 is a force versus displacement curve which indicates that over a rather short pre-travel interval of between 1-2 mm, the force displacement relationship is generally linear and increasing, requiring about 40-60 grams of pressure. Following the pre-travel interval there is a discrete sudden increase in the required force by another 20-40 grams. This force is maintained constant over a displacement interval of between 2 and 3 mm and then suddenly falls to an intermediate level. The force increases slowly from the intermediate level for about one-quarter mm. and then suddenly increases linearly at a significantly higher rate producing an overshoot and bounce back effect over a total of between one-half and 1 mm approximately.

The return path of the key is different from the forward, i.e. depression, path in terms of its force characteristics and defines a generally linear force displacement relationship beyond the overshoot-bounce area.

The entry location at which electrical or mechanical contact is made for data entry extends over a relatively large range of displacements, typically 1-2 mm, along which the force is relatively constant during key displacement.

The keys of the type described hereinabove in connection with FIG. 1 are in general use in conventional and chordic keyboards. It is a particular feature of the present invention that it has been appreciated that keys of this type are not suitable for high speed operation chordic keyboards. The research conducted by applicants has indicated that keyboards of the prior art are unsuitable for the following reasons:

1. In contrast to conventional typewriter keyboards wherein the operator's fingers move from one key to another, in the operation of chordic keyboards, the operator's fingers rest on the keys throughout operation;

2. In contrast to conventional typewriter keyboards wherein only a single key is normally depressed at a given time, in the operation of chordic keyboards, a plurality of keys are normally depressed simultaneously during operation;

3. Whereas in the operation of conventional typewriter keyboards, the discrete increase in force encountered along the key travel path as mentioned in connection with FIG. 1 is operative to produce a reaction in the operator's hand which provides the necessary feedback of a tactile type, such feedback is not sufficient to indicate to an operator of a chordic keyboard which finger or fingers are operating keys at a given time.

4. In chordic keyboards such as that described by the applicants in aforesaid Published British Patent Application No. 2,064,187, the hand of the operator normally rests on a hand rest, at the heel of the hand during keyboard operation. This significantly reduces the feedback transmitted from the fingers back to the arm.

5. The difficulties raised in points 3 and 4 hereinabove could be overcome in principle by significantly increasing the required force exertion for key operation. This is not practical, however, since in chordic keyboard operation more than one key is pressed at a given time, thus producing a cumulative force requirement which would easily tire the operator. This is true notwithstanding that chordic keyboard operation involves significant wrist action, since even when wrist action is involved, individual finger action is also present.

Applicants have also carried out a detailed study of the type and origin of effors in chordic keyboard operation. Two types of errors have been identified, cognitive errors and motoric errors.

Cognitive errors involve mistaken associations between given symbols and their key operation codes. Most cognitive errors arise between symbols which have symmetric codes, such as A and S in the typical code illustrated in FIG. 10.

Motoric errors involve undesired movements and placements of fingers. One source of motoric errors is the well known phenomenon that the movement of certain fingers involuntarily draws other fingers into associated movement. This phenomenon makes certain differential movements and positioning of fingers difficult. An example of the difficulty may be seen by reference to FIG. 10 where an intended indication of I may produce a M instead. Engagement and subsequent disengagement of a key produces an erroneous key entry upon disengagement.

A specific example of a cause of this type of motric error lies in the anatomy of the human hand. As seen by reference to Gray's Anatomy, 28th Edition, page 471 at FIGS. 6-43, finger 4, the finger next to the little finger is the only finger that does not have an independent tendon all to itself. It follows that the independent movement of this finger is extremely limited.

A second source of motoric errors is the failure of fingers to fully transverse the intended travel distance or the failure of the fingers to provide the desired amount of pressure. An example of this difficulty may be seen by reference to FIG. 10 where an intended indication of G may produce a U instead, due to incomplete or insufficient operation of the little finger.

It is to be stressed that the above-described types of errors are particularly characteristic of operation of chordic keyboards. It is therefore extremely important that the structure of the chordic keyboard be such that such errors are identified quickly and unambiguously as to finger by appropiate feedback. It is equally important that the structure of the chordic keyboard be such that such errors are prevented insofar as possible.

A further requirement for a commercially acceptable chordic keyboard is that a repeat function be provided for symbols such as dashes, underlining, backspacing etc. In conventional chordic keyboards, such as those described in references 2, 3 and 4 listed in the Background of the Invention hereinabove, this function is absent since data entry is provided only when all of the keys are released.

On the basis of the above studies and investigations, applicants have reached the following conclusions regarding the structure of chordic keyboards:

1. All feedback which is specific to a given single finger, such as, for example, an audio feedback or a change in finger pressure, is to be eliminated.

2. Tactile feedback which is produced by contact with the keys is irrelevant where contact is maintained with the keys even between actuation thereof.

3. The only efficient type of feedback is kinesthetic feedback which is produced by travel of the fingers or encountering a relatively high resisting force during key actuation. In particular it is appreciated that as the travel path of the fingers is lengthened, the operator's ability to distinguish between fingers in a hand supported operating environment is significantly enhanced. It is appreciated that there exists a physiological distinguishing threshold for each finger and that this threshold differs for different fingers, thus the travel path of each finger is different in a preferred construction of a chordic keyboard. For example, in practice, it is noted that the desired travel path of the thumb is significantly greater than that of the remaining fingers.

4. The required pressure for operating the keys should be relatively small, under 50 grams, approximately, so as to enable chordic keyboard operation with ease and without unduly tiring the operator.

5. The required pressure may vary from key to key. This is necessary in view of the different strengths of the individual fingers of the human hand.

6. The location of the data entry locations along the travel paths of the keys is selected to overcome problems of finger drag and the failure of fingers to travel the entire path. These two sources of errors are to a certain extent directed in opposite directions but it has been appreciated that the former is less critical than the latter. Thus the data entry locations are placed about one-third to one-half along the travel path from the undepressed position. The location of the data entry locations may vary from key to key.

7. The travel paths of the keys should be oriented along the axes of force exertion of the fingers.

8. A hand rest should be provided for holding the hand higher than the base of the keys. More specifically, for all fingers other than the little finger, the hardest surface should be higher than the position of the key top surfaces when fully depressed and lower than the position of the key top surfaces when at rest. For the little finger, the handrest surface should be below the key top surface at all positions.

Figure 2:
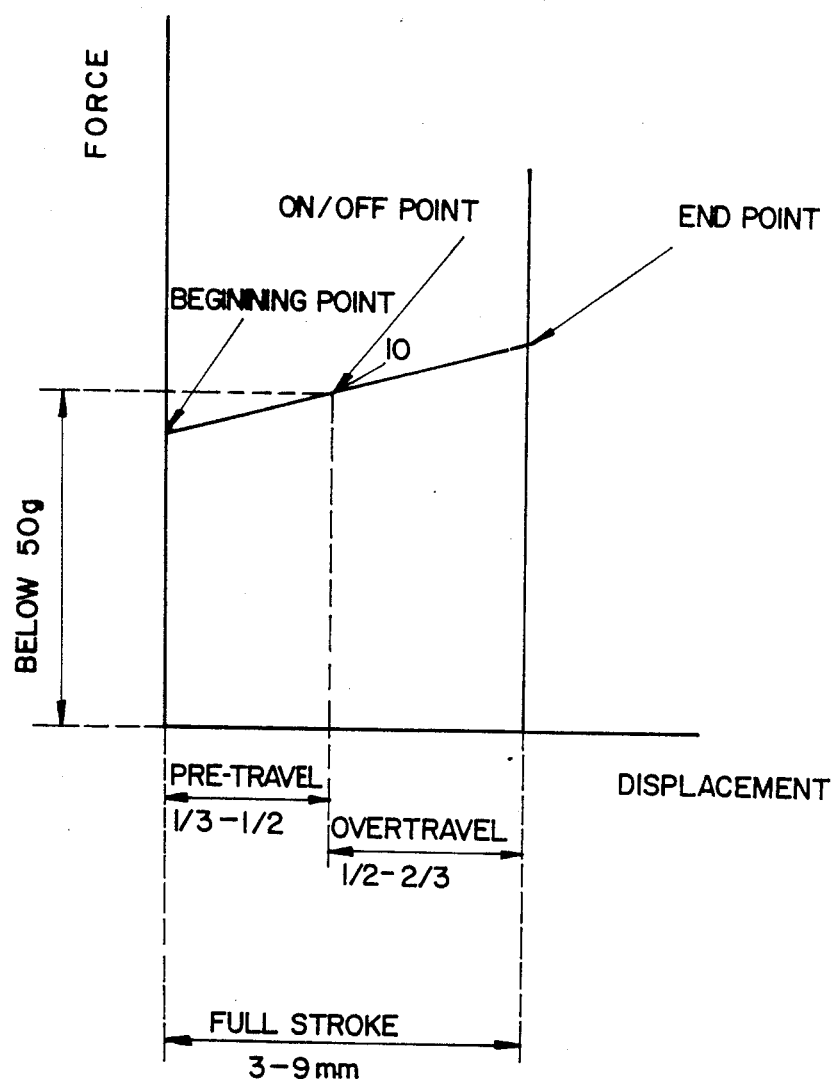
FIG. 2 is a diagrammatic illustration of the operation of a key employed in a chordic keyboard constructed and operative in accordance with the present invention.
Figure 3A:
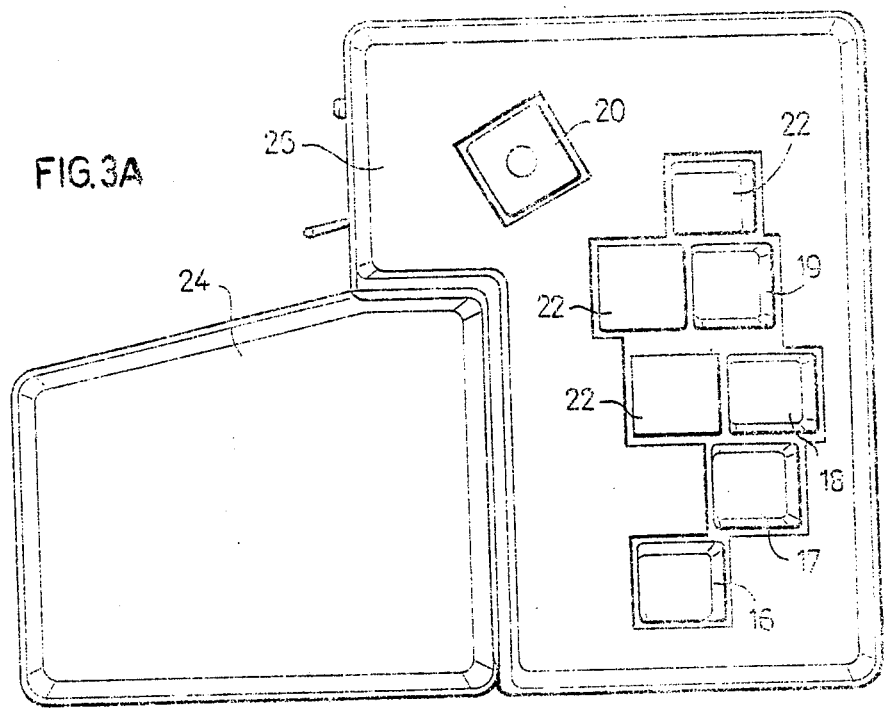
FIGS. 3A and 3B are respective top view and back view illustrations of a chordic keyboard constructed and operative in accordance with an embodiment of the present invention.

Reference is now made to FIG. 2 which illustrates the characteristics of a key constructed and operative in accordance with the present invention which is incorporated in accordance with the present invention in a chordic keyboard. Similarly to the diagram of FIG. 1, which illustrated the prior art embodiment, the diagram of FIG. 2 is a force versus displacement curve. In contrast to the characteristics illustrated in FIG. 1, the key illustrated in FIG. 2 has a linearly increasing force-displacement relationship extending along its entire travel path and does not have any sudden increases of force. The data entry location (toggle point), indicated by reference numeral 10, is located at between one-third and one-half of the distance from the undepressed position along the travel path to the fully depressed position, thus defining a pre-travel distance of between one-third and one-half of the total travel path and an over-travel distance of between one-half and two-thirds of the total travel path.

The force-displacement characteristics of the key are the same in both directions, i.e. during depression and release. the full stroke of the key according to the present invention is preferably between 3 and 9 mm, while the force required to displace the key to the data entry location is about 50 grams or below.

As noted above, the long travel path is designed to provide a high quality finger specific feedback to the operator, while the placement of the data entry location is intended to overcome problems of insufficient finger travel without encountering serious problems with finger drag.

Reference is now made to FIGS. 3-6 which illustrate a chordic keyboard constructed and operative in accordance with a preferred embodiment of the present invention and including a plurality of symbol entry keys 16-20 and function entry keys 22. A handrest 24 is defined on the keyboard housing 26 and supports an operator's hand as illustrated, higher than the base of the keys. FIGS. 3A, 3B, 4 & 6 illustrate the different angular orientations of the different keys and that the travel path of each key is aligned along axis of force exertion of the respective engaging finger. The arrows indicated in FIGS. 3 and 4 indicate the horizontal component of the travel path access for each of the keys in the plane illustrated respectively in each of the two drawings. It is also appreciated that the location of the data entry location along the travel path may also vary from key to key in accordance with the physiological characteristics of the fingers.

Figure 4:
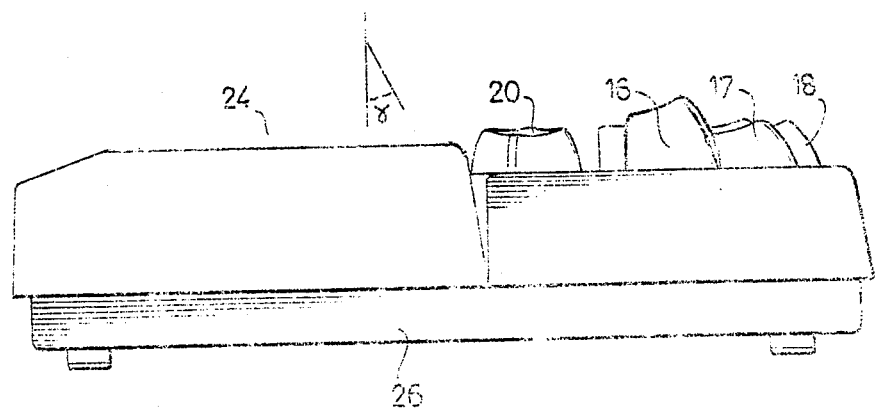
FIG. 4 is a side view illustration of the chordic keyboard of FIG. 3 bearing indications of the travel axes of the individual keys.
Figure 3B:
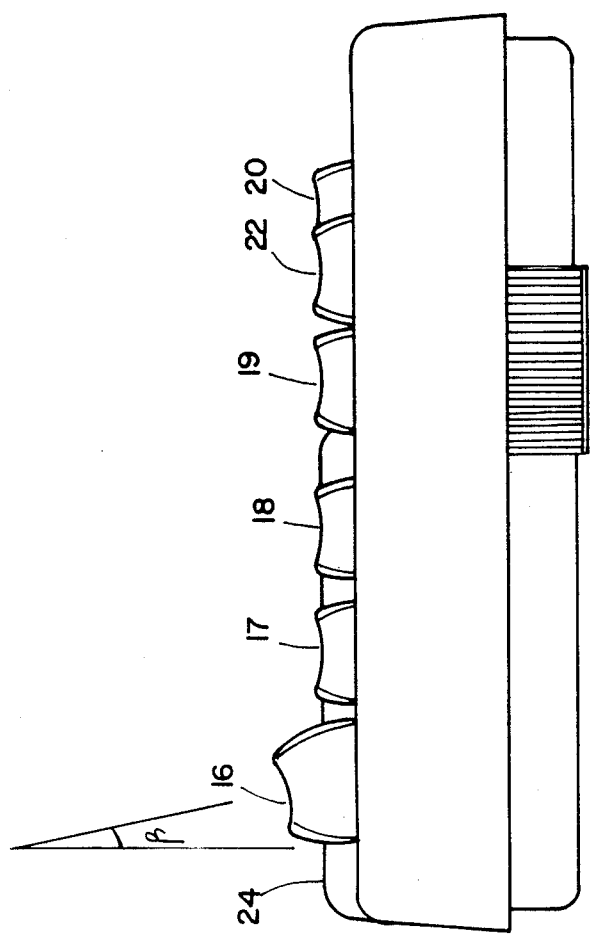
Figure 5:
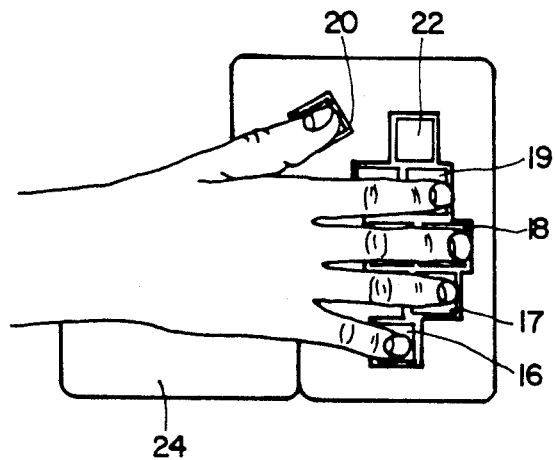
FIGS. 5 & 6 are respective top and side view illustrations of the chordic keyboard of FIGS. 3 and 4 in operation.

The differences between the force requirements and orientations of the travel paths of the individual symbol entry keys 16-20 are summarized in the following table wherein the angle α is measured as shown in FIG. 4 and the angle β is measured as shown in FIG. 3B.

| Key # | Force Requirement for Entry | Angle α | Angle β |
|---|---|---|---|
| 16 | 30 grams | 10° | 20° |
| 17 | 40 grams | 15° | 0° |

-continued

| Key # | Force Requirement for Entry | Angle α | Angle β |
|---|---|---|---|
| 18 | 50 grams | 20° | 0° |
| 19 | 45 grams | 10° | 0° |
| 20 | 50 grams | 0° | 0° |

The foregoing is for a preferred embodiment of the present invention.

Figures 7, 8:
FIG. 7 is a side view illustration of a human hand illustrating the type of motion encountered in multiple key engagement.
FIG. 8 is a side view illustration of a human hand illustrating the type of motion encountered in single key engagement.

Reference is now made to FIGS. 7 and 8 which illustrate the motion of the human hand in two different types of key engagement. FIG. 7 indicates the type of key engagement encountered in the use of a chordic keyboard wherein a plurality of keys are engaged at the same time. It is seen that the motion of the hand in such engagement is about a pivot location located approximately at the wrist of the operator's hand.

FIG. 8 illustrates the type of motion encountered for single key engagement, using conventional or chordic keyboards. Here it is seen that the motion of the finger is a pivotal motion about a location at the base of the finger. It may thus be appreciated that the length of the lever arm defined by the hand in the type of motion illustrated in FIG. 7 is significantly greater than the corresponding motion of the finger as illustrated in FIG. 8. It therefore follows that the angle of incidence of the fingers in the type of motion illustrated in FIG. 7 is further from the vertical than the angle of incidence for the single key type motion shown in FIG. 8.

Figure 9:
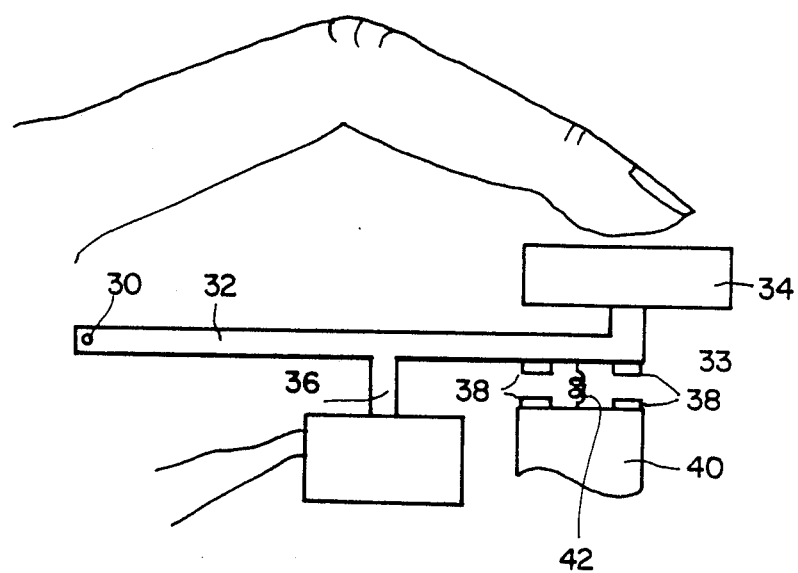
FIG. 9 illustrates a key constructed and operative in accordance with a preferred embodiment of the present invention.

FIG. 9 illustrates a key which is particularly designed to accommodate an angle of incidence which is far from the vertical as in the type of motion encountered in a chordic keyboard and illustrated in FIG. 7 as well as the relatively vertical type of motion as illustrated in FIG. 8, which occurs for single key actuation. The key mechanism of FIG. 9 is relatively vector insensitive.

The key comprises a pivot mounting 30 about which a lever arm 32 moves in pivotal engagement. A key engaging surface 34 having a relatively large area, is mounted at the rearword portion 33 of the lever arm 32 and defines an elongate surface which extends axially along and parallel to a significant portion of the lever arm. A data entry engagement device 36 engages the lever arm 32 at a location therealong. Stop apparatus is provided adjacent the forward portion 33 of the lever arm and comprises a pair of corresponding stop pads 38 disposed on the underside of the lever arm 32, and at a stop member 40. A spring 42 is mounted between the stop member 40 and the forward portion 33 of the lever arm 32 to reach the lever arm upwardly of a normally at rest position.

There are a number of particular features embodied in the key of FIG. 9. The first is the significant length of the key engaging surface which accommodates relatively large finger areas due to the low angle of approach encountered in multi-key operation as shown in FIG. 7. The second important feature is the provision of a pivot location for the key which does not underlie the key itself and, therefore, enables the key to have a travel path significantly shifted from the verticle to the key surface and corresponding to the low angle of approach of the fingers as illustrated in FIG. 7. A further feature of the key of FIG. 9 is the fact that it operates generally uniformly notwithstanding variations in the angle of approach of the fingers and the finger force exertion vector. A fourth important feature is that the pivot location of the key underlies the finger of the operator and thus the travel path of the key is oriented generally in the same direction as the travel path of the finger. In such a way, the keys of FIG. 9 may be used uniformaly to replace conventional keys, each of which would have had to have different travel axis angle in accordance with the teachings of the present invention.

Reference is now made to FIG. 10 which illustrates a plurality of groups 30', 32', 34', 36' etc. of location engagement arrangements. Considering briefly group 30 one sees an array of four such location engagement arrangements arranged in a geometrical series, each being separated from the other by a defined geometric step. Thus, it is seen that the first location engagement arrangement comprises engagement of key 16 and has the letter N corresponding thereto. The next location engagement arrangement comprises engagement of key 17 and is associated with the letter O. The third location engagement arrangement comprises engagement of key 18 and corresponds to the letter T, while the fourth location engagement arrangement comprises engagement of key 19 and corresponds to the letter E. It may be seen that the four location engagement arrangements illustrated in group 30 define a visually recognisable geometrically distinct set and also define a predetermined arrangement between themselves.

The sets corresponding to different groups may be similar and differ by a readily recognizable parameter, such as the number of keys employed for each letter.

The symbols N, O, T, E taken in their corresponding order define the word NOTE. In general, the purpose of the arrangement of the symbol NOTE is to define a word, whether it to be a word apppearing in a language having some meaning or not, which will tend to be remembered by an operator.

It may further be appreciated that the self contained group 30 comprising four symbols and four corresponding location engagement arrangements may be remembered easily and with a high degree of recall.

The next group, group 32, may now be considered and is seen to comprise three location engagement arrangements arranged in a different type of geometrical relationship which is also characterized by two features. The first feature is its distinction from the type of geometrical relationship characterized in any of the other groups. The second feature is defined order relationship between the location engagement arrangements defined by the geometrical relationship therebetween.

As in the case of group 30 each of the location engagement arrangements has a corresponding letter associated therewith. Thus, the location engagement arrangement comprising engagement of keys 19 and 20 is associated with the letter L, while the location engagement comprising engagement of keys 18 and 19 is associated with the letter A. The engagement of keys 17 and 18 is associated with the letter S, while the engagement of keys 16 and 17 is associated with the letter H.

It is a further feature of the present invention that the association between the location engagement arrangements and a particular symbol or letter may be determined in accordance with one or two of the following principles:

The first principle is frequency association, i.e. associating letters which are employed in a given language with a given frequency with geometrical configurations which are relatively easy or alternatively relatively hard to remember. When the association is between relatively frequent symbols and relatively easy combinations the aim is to provide speedy learning. When the association is between relatively frequent symbols and relatively hard to remember geometric associations the guiding principle is reinforcement of the hard to remember combinations by frequent recall.

The second operating principle is that of motoric convenience, i.e. the association of any engaged letters with location engagement arrangements which are relatively easy to execute.

For example, the relative frequency of appearance of letters in the English language is set forth in the following table:

| Letter | Relative Frequency |
| --- | --- |
| A | 7.81 |
| B | 1.28 |
| C | 2.93 |
| D | 4.11 |
| E | 13.05 |
| F | 2.88 |
| G | 1.39 |
| H | 5.85 |
| I | 6.77 |
| J | .23 |
| K | .42 |
| L | 3.60 |
| M | 2.62 |
| N | 7.28 |
| O | 8.21 |
| P | 2.15 |
| Q | .14 |
| R | 6.64 |
| S | 6.46 |
| T | 9.02 |
| U | 2.77 |
| V | 1.00 |
| W | 1.49 |
| X | .30 |
| Y | 1.51 |
| Z | .09 |

Source: Cryptanalysis by Helen Fouche Gaines, Dover Publications, Inc. New York

The average reaction time and percentage error for various patterns of 5-finger location engagement arrangements are set forth in the following table: Source: Human Engineering Guide To Equipment Design, Edited by Harold P. Van Cott, Ph.D., and Robert G. Kinkade, Ph.D., American Institutes for Research, Washington, D.C., 1972. Page 327.

| Pattern* | | | | | DRT (reaction time) (msec) | Error (%) |
| --- | --- | --- | --- | --- | --- | --- |
| (1 | 2 | 3 | 4 | 5) | | |
|  |  |  | 4 |  | 281 | 5.9 |
|  |  | 3 |  |  | 285 | 2.4 |
| 1 |  |  |  |  | 289 | 1.8 |
|  | 2 |  |  |  | 292 | 5.0 |
|  |  |  |  | 5 | 294 | 5.6 |
| 1 |  |  | 4 |  | 306 | 3.8 |
|  | 2 | 3 |  |  | 306 | 8.8 |
|  |  | 3 | 4 |  | 306 | 10.3 |
| 1 | 2 |  |  |  | 310 | 6.2 |
|  | 2 | 3 | 4 |  | 311 | 9.1 |
| 1 |  | 3 |  |  | 312 | 5.0 |
| 1 | 2 | 3 | 4 |  | 314 | 4.1 |
| 1 | 2 | 3 |  |  | 315 | 5.3 |
| 1 |  |  |  | 5 | 315 | 5.6 |
|  |  |  | 4 | 5 | 316 | 11.5 |
|  | 2 |  | 4 |  | 316 | 12.1 |
|  | 2 | 3 | 4 | 5 | 317 | 4.4 |
| 1 |  |  |  |  | 320 | 10.6 |
|  |  | 3 | 4 | 5 | 321 | 7.6 |
| 1 | 2 | 3 | 4 | 5 | 325 | 7.4 |
|  | 2 |  |  | 5 | 326 | 12.4 |
| 1 |  |  | 4 | 5 | 328 | 8.2 |
| 1 | 2 |  | 4 |  | 328 | 13.2 |
| 1 |  | 3 | 4 | 5 | 330 | 12.4 |
| 1 | 2 |  |  | 5 | 335 | 11.8 |
|  |  | 3 |  | 5 | 343 | 13.2 |
| 1 | 2 | 3 |  | 5 | 345 | 18.8 |
| 1 |  | 3 |  | 5 | 349 | 15.0 |
|  | 2 |  | 4 | 5 | 349 | 20.9 |
| 1 | 2 |  | 4 | 5 | 351 | 25.9 |
|  | 2 | 3 |  | 5 | 352 | 22.1 |

*1 = thumb; 5 = small finger

The arrangement of FIG. 10 is constructed in accordance with a preferred embodiment of the invention in that, for the most part, it employs actual words, which are well known and easily remembered. Another particular feature of the arrangement of FIG. 10 is that the relatively most frequently appearing letters are associated with the easiest location engagement arrangements as well as with the geometrical arrays of location engagement arrangements which are easiest to remember. Stated in another way, there is a positive relationship between motoric ease, ease of recall and frequency of symbol occurance. This feature enhances the speed with which the code is learned.

Another important feature of the arrangement of FIG. 10 is that certain letters which appear with a relatively low frequency, such as F, M and Q, for example, are defined by combination of other location engagement arrangements. Each of the letters F, M and Q is defined by the combination of the thumb engagement (1), which alone denotes a blank space, together with another letter. Thus F is defined by space plus P, M is defined by space plus S and Q is defined by space plus H. It is appreciated that other letters may be defined in much the same way.

Reference is now made to FIG. 11 which illustrates five alternative coding configurations for numbers. Column I matches numbers to letters by geometrical similarities. Column II matches numbers to letters having appearing in the same order. Column III matches numbers to letters having relatively high frequency which are associated with key location engagement arrangements as indicated by the code appearing in FIG. 10. Column IV associates numbers directly to key engagement arrangements which may also be used for letters, when a different function key entry is effected. Column V matches numbers to either the first letter or the most distinctive letter of their names.

FIG. 12 is an exemplary partial listing of correspondence between codes for punctuation or symbols and letters. Column I is an illustrative partial listing of symbols. Column II employs the first letter of the name of the symbol as the code letter.

It is a particular feature of the present invention according to a preferred embodiment thereof that of the set of total possible chords or single key location engagements, those chords which are motorically easiest employing 1 and 2 finger engagements, are preferred.

It is also a particular feature of the present invention that the location engagement arrangements are selected insofar as possible to avoid motoric errors. Thus in view of the particular tendon arrangement of finger 4, as described hereinabove, the code of FIG. 10, according to a preferred embodiment of the present invention, does not employ any arrangement in which fingers 3 and 5 are engaged and finger 4 is not engaged, since this arrangement is difficult to execute motorically.

Figure 6:
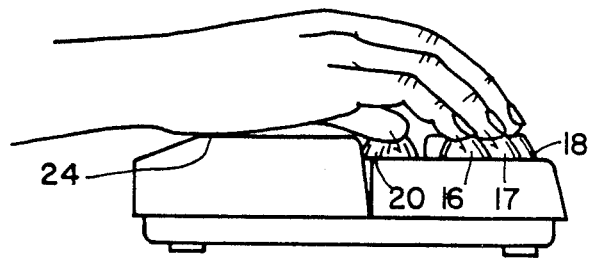
Figure 13:
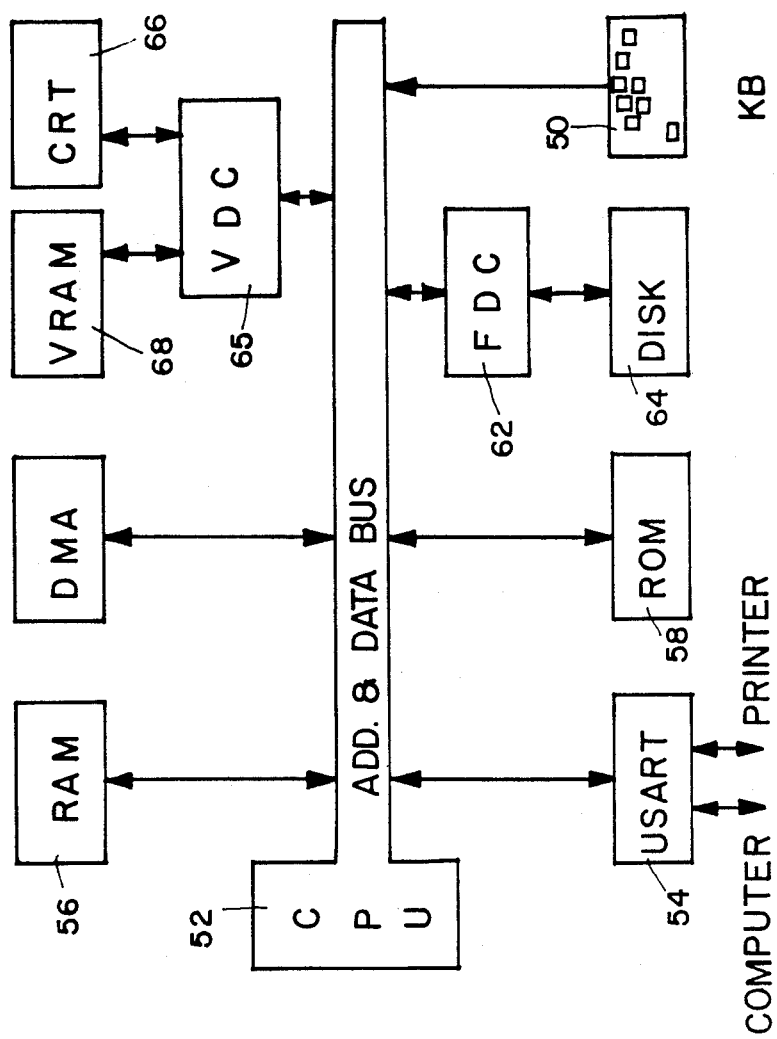
FIG. 13 is a block diagram illustration of the interface between a keyboard of the present invention, a CPU and various perpheral equipment.

Reference is now made to FIG. 13 which is a block diagram illustration of an interface arrangement incorporating a keyboard 50 having an arrangement of keys similar to that described in one of the embodiments of the invention illustrated herein. A data and address bus communicates between the keyboard and a CPU 52 such as a Z-80. An additional computer and a printer (not shown) may be coupled to the data and address bus via a serial interface 54 such as a Z-80 SIO RAM and ROM memories 56 and 58, and a DMA 60 are also coupled to the data and address bus. A floppy disc controller 62 and associated disk 64 and A Video display controller 65 such as a SMC 5027, and associated CRT 66 and CRT Ram 68 are also coupled to the address and data bus. The arrangement illustrated in FIG. 6 is suitable for use for any conventional data storage, processing and communications application.

Figure 14:
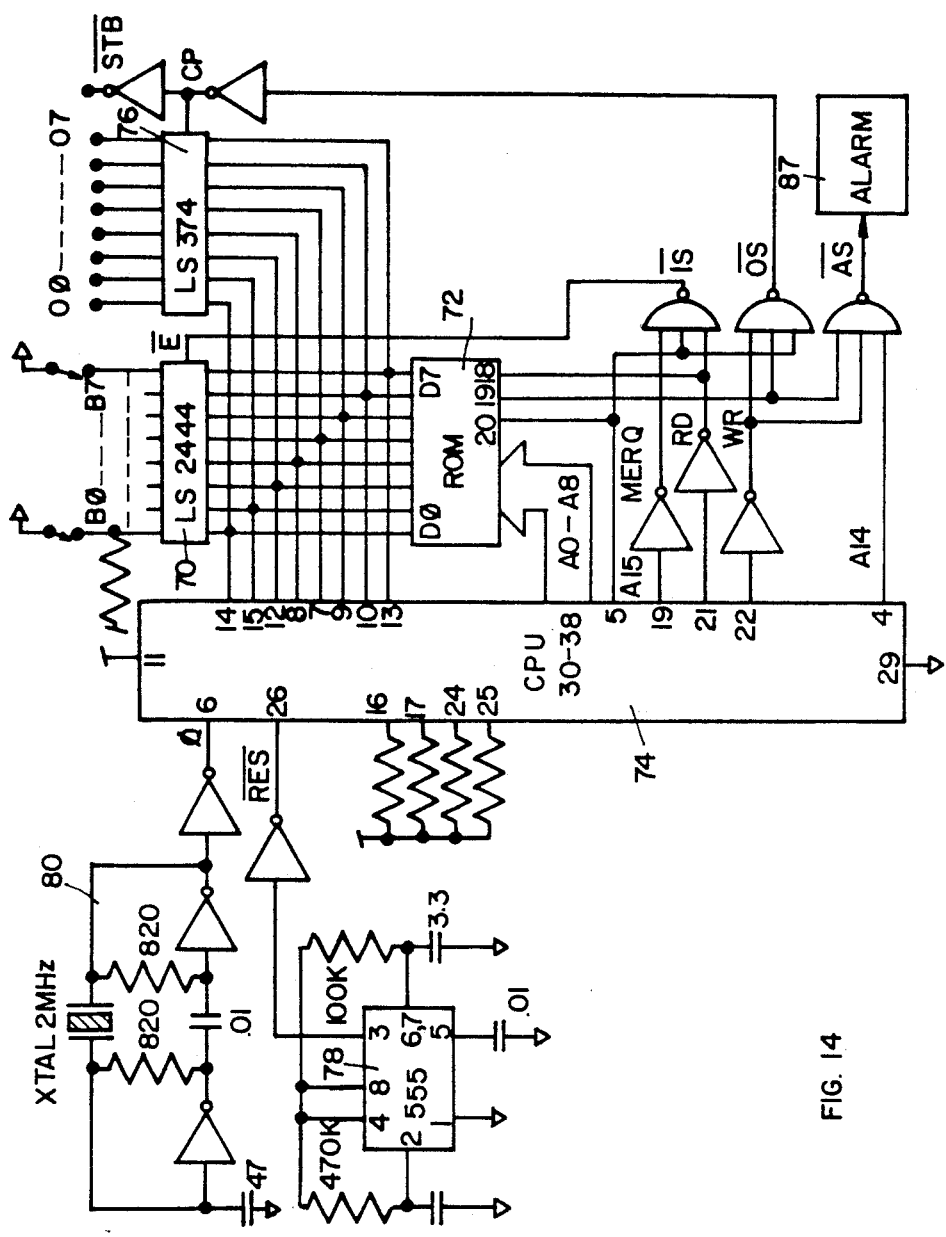
FIG. 14 is a schematic illustration of the circuitry embodied in the keyboard of the embodiment of FIGS. 3 and 4.

Reference is now made to FIG. 14 which is a schematic illustration of the circuitry embodied in the keyboard illustrated in FIGS. 1A and 1B. The eight keys of the keyboard 50 are coupled to respective inputs of an input port 70, typically an LS 244, whose output is connected to the data bus of a CPU 74, typically a Z-80. CPU 74 is operative under the control of a program stored in a ROM 72 such as an 82S181. CPU 74 outputs its data to an output port 76 typically an LS 374 which provides an ASCII coded parallel output and a strobe signal. An alarm 87 is coupled to the CPU 74 for producing an output indication when a data entry location engagement arrangement which does not correspond to a coded letter or other symbol is engaged. This alarm which may be of any desired type, audio or visual indicates operator error and aids in learning and in reducing mistakes.

Additional circuitry including a 555 chip and 2 MHz XTAL, indicated by reference numerals 78 and 80 is also associated with the CPU for desired functioning thereof.

It is a particular advantage of the present invention that revolutionary reductions in required learning time and increased high speed operation were realized by using the above-described keyboards. In controlled experiments conducted by applicants, average students were able to enter 80–90 characters per minute (about 17 words) after three hours of training and after ten hours of training, about 150 characters per minute (about 30 words). This is about one tenth of the time required to train an operator on a conventional chordic or keyboard.

The following is a characteristics and performance table describing the features of the keyboards illustrated in FIGS. 3 and 4.

| Criterion | Motoric (FIGS. 3 and 4) |
| --- | --- |
| Size and Portability | eighth keys weight: 250 gm. dimensions: 150 × 180 mm |
| Learning time required (as per experiments) | 30 minutes to learn code 150 symbols/min after ten hours training 250 symbols/min after thirty hours training |
| Ease of Operation | One hand operated. Low Fatigue |
| Data entry | Equivalent to touch typing |
| Speed Final Speeds | on standard keyboard |
| Recall after Interruption in Practice | Insignificant loss |
| Price | One tenth to one fifth of a conventional keyboard |

It is a particular feature of the present invention and in particular of the embodiment of FIGS. 3 and 4 that the correspondence between the data entry location engagement arrangements and the particular letters and symbols is selected for motoric and learning efficiency. It may be appreciated from an examination of the code tables of that letters which occur relatively frequently, such as "i", "e" and "a", are associated with engagement arrangements that are relatively easy to obtain motorically. Furthermore, letters which occur relatively frequently in particular combinations such as "the" and "ion" are associated with engagement arrangements having relatively easy transitions therebetween and normally employ different fingers.

In accordance with an embodiment of the invention, symbols which occur with high frequency, such as "e" are associated with engagement arrangements which are relatively easy to remember, for increased learning speed. Certain symbols which occur with high frequency may also be associated with engagement arrangements which are relatively hard to remember, for reinforcement of the hard-to-remember combinations.

According to a preferred embodiment of the present invention, the keyboard is operative to register only the maximum number of data entry locations engaged during a predetermined engagement interval. This interval may be defined by disengagement from the data entry locations or alternatively by a fixed time following initial engagement of one or more data entry location.

It is noted that motoric efficiency involves components of low error rate and speed of entry in an optimum combination.

For the sake of completeness of disclosure there follows computer listings of exemplary programs for the CPU in the embodiments of FIGS. 7 and 8 respectively.

```
PRINNTVTT000SS
PRINT VT100.S
;****************************************
;**                                     **
;**            V T 1 0 0                **
;**                                     **
;**   A PROGRAM TO GET CHARACTERS FROM AN **
;**   EIGHT BUTTONS KEY-BOARD IN A MOTO- **
;**   RIC CODE, DECIFER THEM AND SEND   **
;**   THEM TO A VT100 TERMINAL (IT REPLACES **
;**   THE VT100 KEY BOARD WITH ALL KEYS **
;**   INCLUDED)                         **
;**                                     **
;**   I/O DEVICES:                      **
;**      KEY-BOARD  - ADDR. 8000H INPUT **
;**                                     **
;**      CRT        - ADDR. 8000H OUTPUT **
;**                 - ADDR. 4000H STROBE **
;**                                     **
;**   REGISTERS:                        **
;**      C -  BUILDING CODE BY ORING    **
;**      D -  KEY CODE                  **
;**      E -  SHIFT/CONTROL CODE WHEN   **
;**             NECESSARY AND SPECIAL   **
```

```
;**        CONTROL FLAG                      **
;**  B' -  LAST CODE. FOR DETECTING          **
;**        REPEATE STATE                     **
;**  C' -  LAST CONTROL. FOR REPEAT          **
;**        STATE.                            **
;**  D' -  CONTROL OF CHORD                  **
;**  E' -  ENGLISH/HEBREW FLAG               **
;**  H' -  BIT 6 SHIFT FLAG                  **
;**        BIT 7 LAST SHIFT STATUS FOR       **
;**        REPEAT STATE                      **
;**  L' -  CAP LOCK (0=LOCKED)               **
;**                                          **
;*********************************************
        ;PREPARE CRT FOR WRITING
        LD      BC,0
        LD      DE,0
        LD      HL,0
        EXX
;******************************
        ;START OF MAIN LOOP
NXT:
;******************************
;**     ROUTINE TO READ KEY-BOARD    **
;**     FROM ZERO TO ZERO            **
;******************************
        ;REPEAT STATE?
        Ld      A,(IOADD)
        CPL
        LD      B,A
        AND     7FH
        JR      Z,L100
        LD      A,B
        EXX
        CP      B
        EXX
        JR      NZ,L060
        LD      B,0
        LD      C,20
L050:
        DJNZ    L050
        DEC     C
        JR      NZ,L050
EXX
        LD      D,C
        LD      A,B
        SRA     H
        EXX
        JR      L200
L060;
        LD      A,(IOADD)
        CPL
        AND     7FH
        JR      NZ,L060
        ;WAITING FOR NON ZERO INPUT
L100:
        LD      A,(IOADD)
        CPL
        LD      B,A
        AND     7FH
        JR      Z,L100
        ;SAVE FIRST INPUT
        LD      C,B
        ;SET COUNTER FOR 10 MS ZERO WAITING
        ;AND .5 SECONDS REPEAT
L104:
        LD      DE,12000    ;.5/(83*.5E-6)
L105:
        LD      HL,210      ;1E-2/(95*.5E-6)
L110:
        DEC     DE
        LD      A,D
        OR      E
        JR      Z,LEAVE1
        LD      A,(IOADD)
        CPL
        AND     7FH
        JR      NZ,ORING
        LD      DE,12000
        DEC     HL
        LD      A,H
        OR      L
        JR      Z,LEAVE
        JR      L110
        ;ADD THIS TO INPUT C REGISTER
        ;BY ORING IT
ORING:
        ;COUNTING STARTS AGAIN
        LD      B,C
        RES     7,B
        CP      B
        JR      Z,L105
        OR      C
        LD      C,A
        JR      L104
LEAVE1:
        LD      A,C
        EXX
        LD      C,D
        LD      B,A
        SLA     H
        SRA     H
        EXX
        ;HOV FINAL INPUT TO A AND LEAVE
        LD      A,C
        LD      E,C
L200:
        LD      B,A
        AND     60H
        JR      Z,REGULAR ; FUNCTION KEYS
                          PRESSED?
        EXX
        LD      D,A ; SAVE FUNCTION KEYS
        EXX
        LD      A,B
        AND     1FH
        JR      Z,NXT ; ONLY FUNCTION KEYS?
SPECIAL:
        EXX
        LD      D,0
        EXX
        LD      A,B
        RES     7,A
        LD      E,O
        CP      SPOINT ; A SPECIAL POINT?
        JR      NZ,L220
        LD      D,POINT ; YES
        EXX
        BIT     0,E
        EXX
        JP      Z,WRITE
        LD      D,HPOINT
        JP      WRITE
L220:
        CP      SCOMA ; SPECIAL COMA?
        JR      NZ,L230
        LD      D,COMA
        EXX
        BIT     0,E
        EXX
        JP      Z,WRITE
        LD      D,HCOMA
        JP      WRITE
L230:
        CP      SBACK ; SPECIAL BACK?
        JR      NZ,L240
        LD      D,BS
        JP      WRITE
L240:
        CP      SCR ;SPECIAL CR?
        JR      NZ,L241
        LD      D,CR
        JP      WRITE
L241:
        CP      SHIFTC
        JR      NZ,L242
        EXX
        SET     6,H
        EXX
        JP      NXT
L242:
        CP      SCLN ;SPECIAL COLON?
        JR      NZ,L243
        LD      D,CLN
        LD      E,SHIFT
```

```
                -continued                                        -continued
        JP      WRITE                                    RES     7,C        ;** IGNORE KEY-PAD
L243:                                                                                   KEY
        CP      SSMCLN ;SPECIAL SEMI-COLON?      L280:
        JR      NZ,L244                                  LD      B,0
        LD      D,SMCLN                          LD      HL,E-
        EXX                                              TAB
        BIT     0,E                                      EXX
        EXX                                              BIT     0,E
        JP      Z,WRITE                                  EXX
        LD      D,HSMCLN                                 JR      Z,L290
        JP      WRITE                                    LD      HL,HTAB
L244:                                            L290:
        CP      SENTER ;SPECIAL ENTER?                   ADD     HL,BC
        JR      NZ,ERROR                                 LD      A,(HL)
        LD      D,ENTER                                  CP      ERR
        JP      WRITE                                    JR      Z,ERROR
;NOT EXISTING CODE                                       LD      D,A
ERROR:                                                   LD      A,C
        EXX                                              AND     60H
        RES     3,H                                      JR      NZ,WRIT-
        EXX                                                      ES
        JP      NXT                                      BIT     6,E        ;** SPECIAL CONTROL?
;****************************                            JR      NZ,WRITE
        ;KEING WAS ON 5 REGULAR BUTTONS ONLY             BIT     7,C        ;KEY PAD?
REGULAR:                                                 JR      NZ,L400
        LD      A,B             ; ASSEMBLE CODE  ;** SHIFT OR CAPS LOCK?
        EXX             ; ASSEMBLE CODE                  EXX
        ADD     A,D             ;                        BIT     6,H
        LD      D,0                                      EXX
        BIT     0,E                                      JR      Z,L300
        EXX                                              LD      E,SHIFT
        JR      NZ,L245                                  JR      WRITE
        CP      CAPLOC                           L300:
        JR      NZ,L250
        JR      L246                                     EXX
L245:                                                    BIT     0,L
:       CP      HCAPLC                                   EXX
        JR      NZ,L250                                  JR      Z,WRITE
L246:                                                    LD      E,CAPCD
        EXX                                              JR      WRITE
        LD      A,L                              WRITES:
        CPL                                              CP      60H
        LD      L,A                                      JR      Z,WRITEC
        EXX                                      L400:
        JP      NXT                                      BIT     7,D
L250:                                                    JR      Z,WRITE
        CP      SWITCH                                   LD      E,SHIFT
        JR      NZ,L260                                  JR      WRITE
        EXX                                      WRITEC:
        LD      A,E                                      BIT     7,D
        CPL                                              JR      Z,WRITE
        LD      E,A                                      LD      E,CTRL
        EXX                                      WRITE:
        JP      NXT                              ;** SEND CODE TWICE
;** THE CODE IS PLACED IN D                              LD      H,2
;** IF SHIFT OR CONTROL IS NEEDED                L500:
;** THIER CODE IS LOADED TO E                            LD      A,D
;*** ROUTINE SENDS D AND IF NOT ZERO                     LD      (IOADD),A
;** SENDS E ALSO                                         LD      (STROBE),A
L260:                                                    LD      B,200
        ;TAKE CODE OUT OF TABLE                  L800:
        LD      C,A                                      DJNZ    L800
        AND     0E0H                                     LD      A,E
        CP      80H             ;** KEY-PAD AREA?        AND     A
        JR      NZ,L265                                  JR      Z,L820
        EXX                                              LD      (IOADD),A
        BIT     6,H                                      LD      (STROBE),A
        EXX                                              LD      B,200
        JR      Z,L280                           L810:
        RES     7,C                                      DJNZ    L810
        JR      L280                             L820:
L265:                                                    LD      A,EOSCAN
        CP      0E0H            ;** SPECIAL CONTROL?     LD      (IOADD),A
        JR      NZ,L270                                  LD      (STROBE),A
        LD      A,C             ;** TAKE THE LETTER ;** WAIT 20 M.S.
                                CODE                     LD      B,0
        AND     1FH             ;** OUT OF THE TABLE  L600: LD    A,12
        LD      C,A
        LD      E,CTRL          ;** ADD CONTROL KEY      DJNZ    L600
                                TO IT                    DEC     A
        JR      L280                                     JR      NZ,L600
L270:                                                    DEC     H
                                                         JR      NZ,L500
```

```
;** SEND EMPTY SCAN
        LD      A,EOSCAN
        LD      (IOADD,A
        LD      (STROBE),A
        EXX
        RES     6,H
        EXX
        JP      NXT
;****************************
;** CONSTANTS
CR      EQU 64H
ENTER   EQU 51H
BS      EQU 20H ; BACK SPACE
RTAB    EQU 33H
SHIFT   EQU 0FDH
CAPCD   EQU 7EH
CTRL    EQU 7CH
EOSCAN  EQU 07FH
IOADD   EQU 8000H
STROBE  EQU 4000H
ERR     EQU 0FPH
POINT   EQU 65H
COMA    EQU 66H
CLN     EQU 56H
SMCLN   EQU 56H
SPOINT  EQU 44H ; CODE FOR SPECIAL POINT
SCOMA   EQU 28H ; CODE FOR SPECIAL COMA
SBACK   EQU 70H ; CODE FOR SPECIAL BACK
SCLN    EQU 60H ; CODE FOR SPECIAL COLON
SCR     EQU 50H ; CODE FOR SPECIAL CR
SSMCLN  EQU 70H ; CODE FOR SPECIAL SEMI-COLON
SENTER  EQU 30H ; CODE FOR SPECIAL ENTER
SHIFTC  EQU 61H ; CODE FOR SHIFT
CAPLOC  EQU 6PH ; CODE FOR CAPS LOCK
;** TABLE OF STANDARD KEY BOARD CODES
;** FP IS FOR A NON EXISTING CODE
ETAB:
    ;LETTERS
        DEFB ERR
        DEFB 67H            ;N
        DEFB 06H            ;O
        DEFB 58H            ;H
        DEFB 08H            ;T
        DEFB ERR
        DEFB 5AH            ;S
        DEFB 05H            ;P
        DEFB 19H            ;E
        DEFB 78H            ;V
        DEFB 07H            ;Y
        DEFB 7AH            ;Z
        DEFB 4AH            ;A
        DEFB ERR
        DEFB 17H            ;U
        DEFB 48H            ;G
        DEFB 77H            ;SPACE
        DEFB 59H            ;D
        DEFB 16H            ;I
        DEFB 0AH            ;Q
        DEFB 18H            ;R
        DEFB ERR
        DEFB 76H            ;M
        DEFB 49H            ;F
        DEFB 46H            ;L
        DEFB 69H            ;X
        DEFB 09H            ;W
        DEFB 57H            ;J
        DEFB 79H            ;C
        DEFB ERR
        DEFB 47H            ;K
        DEFB 68H            ;B
    ;SIGNS
        DEFB ERR
        DEFB 0A9H           ;H
        DEFB 0C5H           ;OR
        DEFB 25H            ;-
        DEFB 45H            ;\
        DEFB ERR
        DEFB 75H            ;/
        DEFB 0B4H           ;+
        DEFB 34H            ;=
        DEFB 0B8H           ;%
        DEFB 0D5H           ;"
        DEFB 55H            ;'
        DEFB 0B6H           ;*
        DEFB ERR
        DEFB 0A5H           ;_
        DEFB 0E5H           ;>
        DEFB 77H            ;SPACE
        DEFB 0A6H           ;(
        DEFB 14H            ;]
        DEFB 0F5H           ;?
        DEFB 0B7H           ;;
        DEFB ERR
        DEFB 0ABH           ;$
        DEFB ERR
        DEFB 0E6H           ;<
        DEFB 9AH            ;!
        DEFB 0A7H           ;&
        DEFB 95H            ;{
        DEFB 94H            ;}
        DEFB ERR
        DEFB 0B5H           ;)
        DEFB 15H            ;L
    ;NUMBERS
        DEFB ERR
        DEFB 26H            ;9
        DEFB 1AH            ;1
        DEFB 29H            ;3
        DEFB 39H            ;2
        DEFB ERR
        DEFB 27H            ;7
        DEFB ERR
        DEFB 36H            ;8
        DEFB 38H            ;5
        DEFB ERR
        DEFB 35H            ;0
        DEFW 0FFFFH
        DEFW 0FFFFH
        DEFB 77H            ;SPACE
        DEFW 0FFFFH
        DEFW 0FFFFH
        DEFW 0FFFFH
        DEFB 28H            ;4
        DEFB ERR
        DEFB 37H            ;6
        DEFW 0FFFFH
        DEFW 0FFFFH
        DEFW 0FFFFH
    ;CONTROL
        DEFB ERR
        DEFB 6AH            ;NO SCROLL
        DEFB ERR
        DEFB 0C8H           ;HORN
        DEFB 3AH            ;TAB
        DEFB ERR
        DEFB 7BH            ;SETUP
        DEFB ERR
        DEFB 2AH            ;ESC
        DEFB ERR
        DEFW 0FFFFH
        DEFW 0FFFFH
        DEFB 30H            ;UP
        DEFB ERR
        DEFB 77H            ;SPACE
        DEFB 03H            ;DELETE
        DEFW 0FFFFH
        DEFB 10H            ;-->
        DEFW 0FFFFH
        DEFB 44H            ;LINE FEED
        DEFB 20H            ;<--
        DEFB ERR
        DEFB 22H            ;DOWN
        DEFB ERR
        DEFB 00            ;CAPS LOCK
        DEFW 0FFFFH
        DEFB 23H            ;BREAK
    ;KEY PAD
        DEFB ERR
        DEFB 70H            ;9
        DEFB 53H            ;1
        DEFB 71H            ;3
        DEFB 52H            ;2
        DEFB ERR
```

```
            DEFB 40H        ;7
            DEFB 60H        ;.
            DEFB 50H        ;8
            DEFB 62H        ;5
            DEFB ERR
            DEFB 43H        ;0
            DEFB 32H        ;PF1
            DEFB ERR
            DEFB 30H        ;UP
            DEFB 51H        ;ENTER
            DEFB 77H        ;SPACE
            DEFB 24H        ;OR?
            DEFB 31H        ;PF3
            DEFB ERR
            DEFB 10H        ;-->
            DEFB ERR
            DEFB 73H        ;-
            DEFB 63H        ;4
            DEFB 20H        ;<--
            DEFB 72H        ;6
            DEFB 22H        ;DOWN
            DEFB 41H        ;PF4
            DEFB 61H        ;,
            DEFB ERR
            DEFB 0A4H       ;NOT
            DEFB 42H        ;PF2
HTAB:
         ;LETTERS
            DEFT ERR
            DEFB 67H        ;n
            DEFB 47H        ;l
            DEFB 66H        ;z
            DEFB 17H        ;e
            DEFB ERR
            DEFB 4AH        ;y
            DEFB 19H        ;w
            DEFB 58H        ;i
            DEFB ERR
            DEFB 49H        ;k
            DEFB ERR
            DEFB 18H        ;x
            DEFB ERR
            DEFB 08H        ;
            DEFB 57H        ;g
            DEFB 77H        ;SPACE
            DEFB 76H        ;v
            DEFB 48H ;r
            DEFB 59H        ;b
            DEFB 79H        ;a
            DEFB ERR
            DEFB 05H        ;t
            DEFB 7AH        ;f
            DEFB 78H        ;d
            DEFB ERR
            DEFB 5AH        ;c
            DEFB ERR
            DEFB 68H        ;p
            DEFB ERR
            DEFB 69H        ;q
            DEFB 07H        ;h
         ;SIGNS
            DEFB ERR
            DEFB 25H        ;-
            DEFB 75H        ;/
            DEFB 0A5H       ;
            DEFB 94H        ;}
            DEFB ERR
            DEFB 0F5H       ;?
            DEFB 9AH        ;.
            DEFW 0FFFFH
            DEFB 0B6H       ;*
            DEFB ERR
            DEFB 0A7H       ;&
            DEFB ERR
            DEFB 34H        ;=
            DEFB 0E6H       ;<
            DEFB 77H        ;SPACE
            DEFB 15H        ;[
            DEFB 0B7H       ;
            DEFB 55H        ;'
            DEFB 0B8H       ;%
            DEFB ERR
            DEFB 0A6H       ;(
            DEFB 95H ;{
            DEFB 0B4H       ;+
            DEFB ERR
            DEFB 0A8H       ;$
            DEFB ERR
            DEFB 14H        ;]
            DEFB ERR
            DEFB 0B5H       ;)
            DEFB 0E5H       ;>
         ;NUMBERS
            DEFB ERR
            DEFB 06H        ;m
            DEFW 0FFFFH
            DEFB 37H        ;6
            DEFB ERR
            DEFW 0FFFFH
            DEFB 35H        ;0
            DEFB ERR
            DEFB 46H        ;L
            DEFB ERR
            DEFW 0FFFFH
            DEFB 1AH        ;1
            DEFB 36H        ;8
            DEFB 77H        ;SPACE
            DEFB 65H        ;u
            DEFB ERR
            DEFB 29H        ;3
            DEFB 39H        ;2
            DEFB ERR
            DEFB 56H        ;s
            DEFB 27H        ;7
            DEFB 38H        ;5
            DEFB ERR
            DEFB 28H        ;4
            DEFB ERR
            DEFB 16H        ;o
            DEFW 0FFFFH
            DEFB 26H        ;9
         ;CONTROL
            DEFB ERR
            DEFB 03H        ;DELETE
            DEFB 6AH        ;NO SCROLL
            DEFB ERR
            DEFW 0FFFFH
            DEFB 20H        ;<--
            DEFB 7BH        ;SETUP
            DEFB 10H        ;-->
            DEFB ERR
            DEFW 0FFFFH
            DEFB 22H        ;DOWN
            DEFB ERR
            DEFB 00         ;CAPS LOCK
            DEFB 23H        ;BREAK
            DEFB 77H        ;SPACE
            DEFB ERR
            DEFB 30H        ;UP
            DEFB ERR
            DEFB 2AH        ;ESC
            DEFB ERR
            DEFB 0C8H       ;HORN
            DEFB ERR
            DEFB 44H        ;LINE FEED
            DEFW 0FFFFH
            DEFW 0FFFFH
            DEFW 0FFFFH
            DEFB 3AH        ;TAB
         ;KEY PAD
            DEFB ERR
            DEFB 73H        ;-
            DEFB 0A4H       ;NOT"
            DEFB 41H        ;PF4
            DEFB 72H        ;6
            DEFB ERR
            DEFB 31H        ;PF3
            DEFB 32H        ;PF1
            DEFB 43H        ;0
            DEFB ERR
            DEFB 0C5H       ;OR
            DEFB ERR
            DEFB 42H        ;PF2
            DEFB ERR
```

-continued

| | |
|---|---|
| DEFB 53H | ;1 |
| DEFB 50H | ;8 |
| DEFB 77H | ;SPACE |
| DEFB 0D5H | ;" |
| DEFB ERR | |
| DEFB 71H | ;3 |
| DEFB 52H | ;2 |
| DEFB ERR | |
| DEFB 61H | ;, |
| DEFB 40H | ;7 |
| DEFB 62H | ;5 |
| DEFB ERR | |
| DEFB 63H | ;4 |
| DEFB ERR | |
| DEFB 60H | ;. |
| DEFB ERR | |
| DEFB 0A9H | ;# |
| DEFB 70H | ;9 |
| END | |
| DEFW 0FFFFH | |
| DEFW 0FFFFH | |
| DEFW 0FFFFH | |
| DEFB 20H | ;<-- |
| DEFB 24H | |
| DEFB 10H | ;--> |
| DEFW 0FFFFH | |
| DEFB 22H | ;DOWN |
| DEFB 51H | ;ENTER |
| DEFB 30H | ;UP |
| DEFW 0FFFFH | |
| DEFB 0AH | ;Q |
| DEFB 09H | ;W |
| DEFB 45H | ; |
| % | |

It will be appreciated by persons skilled in the art that the present invention is not limited to what has been particularly shown and described hereinabove. Rather the scope of the present invention is defined only by the claims which follow:

We claim:

1. A chordic keyboard comprising:
at least five chordic data entry locations, each corresponding to a one of the five fingers of the human hand; and
first correlation means for correlating a set of chordic data entry location engagement combinations to a first set of letters in accordance with a first code, said first code being characterized in that available chordic data entry location engagement combinations are arranged in a plurality of groups, the engagement combinations in each group having a predetermined relationship among their fingering patterns, each group being matched with letters forming a recognizable combination of letters, whereby said fingering patterns are readily memorizable and wherein said first code is additionally characterized in that chordic data entry location engagements having relatively easy motoric transitions therebetween are matched to letters statistically occuring adjacent each other with relatively high frequency.

2. A chordic keyboard comprising:
at least five chordic data entry locations, each corresponding to a one of the five fingers of the human hand;
first correlation means for correlating a set of chordic data entry location engagement combinations to a first set of letters in accordance with a first code, said first code being characterized in that available chordic data entry location engagement combinations are arranged in a plurality of groups, the engagement combinations in each group having a predetermined relationship among their fingering patterns, each group being matched with letters forming a recognizable combination of letters, whereby said fingering patterns are readily memorizable; chordic function choice entry means including a plurality of function choice entry locations arranged for chordic operation; and
second correlation means actuable by engagement of said chordic function choice entry means for correlating a set of non-letter symbols to said set of chordic data entry location engagement combinations in accordance with a second code, and
wherein said first code is additionally characterized in that chordic data entry location engagements having relatively easy motoric transitions therebetween are matched to letters statistically occuring adjacent each other with relatively high frequency.

3. A chordic keyboard comprising:
at least five chordic data entry locations, each corresponding to a one of the five fingers of the human hand;
first correlation means for correlating a set of chordic data entry location engagement combinations to a first set of letters in accordance with a first code, said first code being characterized in that available chordic data entry location engagement combinations are arranged in a plurality of groups, the engagement combinations in each group having a predetermined relationship among their fingering patterns, each group being matched with letters forming a recognizable combination of letters, whereby said fingering patterns are readily memorizable; and means for providing repeat entry upon engagement with a chordic data entry location for a time beyond a predetermined threshold duration and wherein said first code is additionally characterized in that chordic data entry location engagements having relatively easy motoric transitions therebetween are matched to letters statistically occuring adjacent each other with relatively high frequency.

4. A chordic keyboard comprising:
at least five chordic data entry locations, each corresponding to a one of the five fingers of the human hand;
first correlation means for correlating a set of chordic data entry location engagement combinations to a first set of letters in accordance with a first code, said first code being characterized in that available chordic data entry location engagement combinations are arranged in a plurality of groups, the engagement combinations in each group having a predetermined relationship among their fingering patterns, each group being matched with letters forming a recognizable combination of letters, whereby said fingering patterns are readily memorizable; and
chordic function choice entry means including a plurality of function choice entry locations arranged for chordic operation; and
second correlation means actuable by engagement of said chordic function choice entry means for correlating a set of non-letter symbols to said set of chordic data entry location engagement combinations in accordance with a second code, and means for providing repeat entry upon engagement with a chordic data entry location for a time beyond a predetermined threshold duration, and wherein said first code is additionally characterized in that chordic data entry location engagements having relatively easy motoric transitions therebetween are matched to letters statistically occuring adjacent each other with relatively high frequency.

5. A chordic keyboard according to claim 1 and wherein said plurality of groups includes a first group of chordic data entry location engagement combinations wherein each combination comprises a single location engagement, and a second group of chordic data entry location engagement combinations wherein each combination comprises engagement of two locations.

6. A chordic keyboard according to claim 5 and wherein in said second group of chordic data entry location engagement combinations each combination comprises engagement of two adjacent locations.

7. A chordic keyboard according to claim 5 and wherein in said second group of chordic data entry location engagement combinations each combination comprises engagement of two non-adjacent locations.

8. A chordic keyboard according to claim 5 and wherein said plurality of groups also comprises a third group of chordic data entry location engagement combinations wherein each combination comprises engagement of three locations.

9. A chordic keyboard according to claim 2 and wherein said plurality of groups includes a first group of chordic data entry location engagement combinations wherein each combination comprises a single location engagement, and a second group of chordic data entry location engagement combinations wherein each combination comprises engagement of two locations.

10. A chordic keyboard according to claim 9 and wherein in said second group of chordic data entry location engagement combinations each combination comprises engagement of two adjacent locations.

11. A chordic keyboard according to claim 9 and wherein in said second group of chordic data entry location engagement combinations each combination comprises engagement of two non-adjacent locations.

12. A chordic keyboard according to claim 9 and wherein said plurality of groups also comprises a third group of chordic data entry location engagement combinations wherein each combination comprises engagement of three locations.

13. A chordic keyboard according to claim 3 and wherein said plurality of groups includes a first group of chordic data entry location engagement combinations wherein each combination comprises a single location engagement, and a second group of chordic data entry location engagement combinations wherein each combination comprises engagement of two locations.

14. A chordic keyboard according to claim 13 and wherein in said second group of chordic data entry location engagement combinations each combination comprises engagement of two adjacent locations.

15. A chordic keyboard according to claim 13 and wherein in said second group of chordic data entry location engagement combinations each combination comprises engagement of two non-adjacent locations.

16. A chordic keyboard according to claim 13 and wherein said plurality of groups also comprises a third group of chordic data entry location engagement combinations wherein each combination comprises engagement of three locations.

17. A chordic keyboard comprising:

at least five chordic data entry locations, each corresponding to a one of the five fingers of the human hand;

first correlation means for correlating a set of chordic data entry location engagement combinations to a first set of letters in accordance with a first code, said first code being characterized in that available chordic data entry location engagement combinations are arranged in a plurality of groups, the engagement combination in each group having a predetermined relationship among their fingering patterns, each group being matched with letters forming a recognizable combination of letters, whereby said fingering patterns are readily memorizable;

chordic function choice entry means including a plurality of function choice entry locations arranged for chordic operation; and second correlation means actuable by engagement of said chordic function choice entry means for correlating a set of non-letter symbols to said set of chordic data entry location engagement combinations in accordance with a second code, wherein said plurality of groups includes a first group of chordic data entry location engagement combinations wherein each combination comprises a single location engagement, and a second group of chordic data entry location engagement arrangements combinations wherein each combination comprises engagement of two locations, and wherein said first code is further characterized in that chordic data entry location engagement combinations which are motorically relatively easy to achieve are matched to letters statistically occurring with relatively high frequency in a given language.

18. A chordic keyboard comprising:

at least five chordic data entry locations, each corresponding to a one of the five fingers of the human hand;

first correlation means for correlating a set of chordic data entry location engagement combinations to a first set of letters in accordance with a first code, said first code being characterized in that available chordic data entry location engagement combinations are arranged in a plurality of groups, the engagement combinations in each group having a predetermined relationship among their fingering patterns, each group being matched with letters forming a recognizable combination of letters, whereby said fingering patterns are readily memorizable; and means for providing repeat entry upon engagement with a chordic data entry location for a time beyond a predetermined threshold duration, and wherein said plurality of groups includes a first group of chordic data entry location engagement combinations wherein each combination comprises a single location engagement, and a second group of chordic data entry location engagement combinations wherein each combination comprises engagement of two locations, and wherein said first code is further characterized in that chordic data entry location engagement combinations which are motorically relatively easy to achieve are matched to letters statistically occurring with relatively high frequency in a given language.

19. A chordic keyboard according to claim 4 and wherein said plurality of groups includes a first group of chordic data entry location engagement combinations wherein each combination comprises a single location engagement, and a second group of chordic data entry location engagement combinations wherein each combination comprises engagement of two locations.

20. A chordic keyboard according to claim 5 and wherein in said second group of chordic data entry location engagement combinations each combination comprises engagement of two adjacent locations.

21. A chordic keyboard according to claim 5 and wherein in said second group of chordic data entry location engagement combination each combination comprises engagement of two non-adjacent locations.

22. A chordic keyboard according to claim 5 and wherein said plurality of groups also comprises a third group of chordic data entry location engagement combinations wherein each combination comprises engagement of three locations.

* * * * *